(12) United States Patent
Ahearn et al.

(10) Patent No.: US 10,856,953 B2
(45) Date of Patent: Dec. 8, 2020

(54) FAST TRACK DENTAL OPERATIVE UNIT

(71) Applicants: David J. Ahearn, Little Compton, RI (US); Edward Carey, Westport, MA (US)

(72) Inventors: David J. Ahearn, Little Compton, RI (US); Edward Carey, Westport, MA (US)

( * ) Notice: Subject to any disclaimer, the term of this patent is extended or adjusted under 35 U.S.C. 154(b) by 0 days.

(21) Appl. No.: 16/553,133

(22) Filed: Aug. 27, 2019

(65) Prior Publication Data

US 2020/0069393 A1      Mar. 5, 2020

Related U.S. Application Data

(60) Provisional application No. 62/723,899, filed on Aug. 28, 2018.

(51) Int. Cl.
| | |
|---|---|
| *A61C 1/08* | (2006.01) |
| *F21V 21/34* | (2006.01) |
| *F21V 21/28* | (2006.01) |
| *F21V 21/40* | (2006.01) |
| *F21S 8/06* | (2006.01) |

(52) U.S. Cl.
CPC .............. *A61C 1/088* (2013.01); *F21S 8/066* (2013.01); *F21V 21/28* (2013.01); *F21V 21/34* (2013.01); *F21V 21/403* (2013.01)

(58) Field of Classification Search
CPC .......... A61C 1/088; F21S 8/066; F21V 21/03; F21V 21/28; F21V 21/34; F21V 21/403; F21W 2131/202
USPC .......................................... 362/572–573, 804
See application file for complete search history.

(56) References Cited

U.S. PATENT DOCUMENTS 9,149,350 B2 * 10/2015 Ahearn .................. F21S 8/066

* cited by examiner

*Primary Examiner* — Jason M Han
(74) *Attorney, Agent, or Firm* — Adler Pollock & Sheehan P.C

(57) ABSTRACT

A unit includes a rail system having a trolley and first and second hook rails that are configured to mate with corresponding portions of a mounting board secured to a ceiling, a length between the first and second hook rails approximately equal to a width of the mounting board to insure a snug fit, an arm system configured to link to the rail system and having an upper tube section, a middle tube section and a lower tube section, an end of the upper tube section including slip ring wire connections to enable the upper tube section to rotate within the rail system, and an illumination unit configured to link to the lower tube section and having an end of the lower tube section including slip ring wire connections to enable the illumination unit to rotate with respect to the lower tube section.

13 Claims, 6 Drawing Sheets

FAST TRACK DENTAL OPERATIVE UNIT

CROSS REFERENCE TO RELATED APPLICATIONS

This application claims benefit from U.S. Provisional Patent Application Ser. No. 62/723,899, filed Aug. 28, 2018, which is incorporated by reference in its entirety.

BACKGROUND OF THE INVENTION

The present invention relates generally to lighting, and more particularly to a fast track dental operative unit.

In general, dental operating lights or dental operatory lights are a standard fixture in every dental practice, because without these lights dentistry would be literally be in the dark ages. Something as simple as lightning the oral cavity can actually make or break the success of a dental operatory.

In general, operatory lights are permanently mounted to the ceiling, cabinet, wall or delivery system and have a variety of swing arm options. These dental lights are powered by either halogen or light-emitting diode (LED) technology and are adjustable to the needs of the dentist, hygienist and assistant.

SUMMARY OF THE INVENTION

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In an aspect, the invention features a fast track dental operative unit including a rail system, the rail system including a trolley and first and second hook rails that are configured to mate with corresponding portions of a mounting board secured to a ceiling, a length between the first and second hook rails approximately equal to a width of the mounting board to insure a snug fit, an arm system configured to link to the rail system, the arm system including an upper tube section, a middle tube section and a lower tube section, an end of the upper tube section including slip ring wire connections to enable the upper tube section to rotate a full 360 degrees within the rail system, and an illumination unit configured to link to the lower tube section, an end of the lower tube section including slip ring wire connections to enable the illumination unit to rotate a full 360 degrees with respect to the lower tube section.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

The invention will be more fully understood by reference to the detailed description, in conjunction with the following figures, wherein.

DETAILED DESCRIPTION

Figure 1:
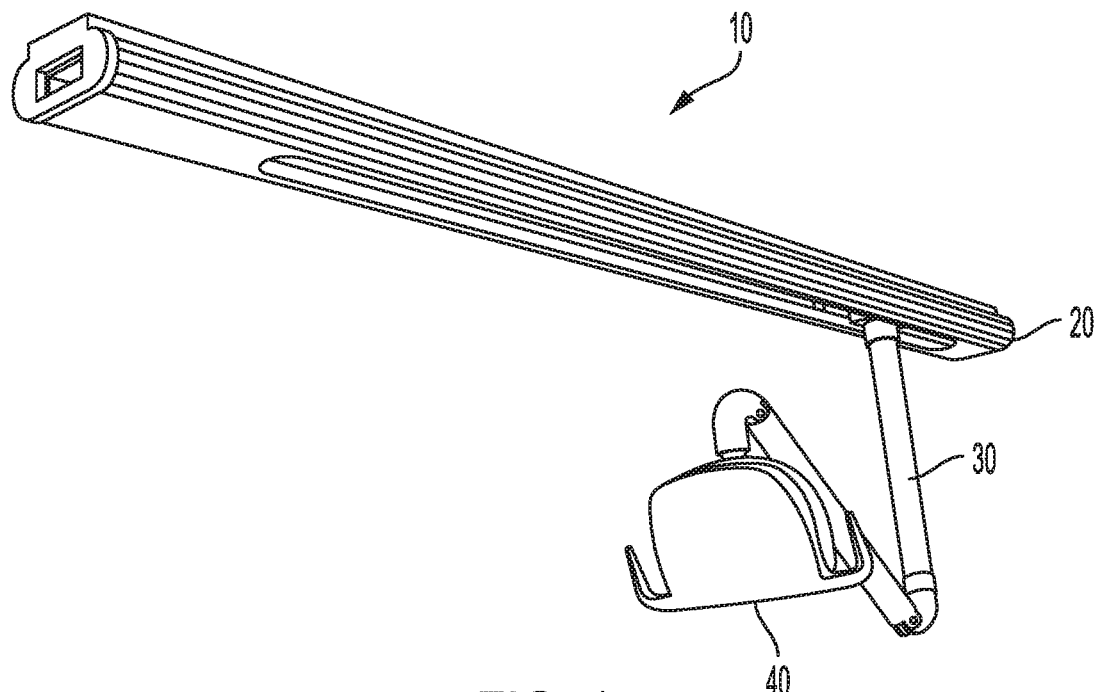
FIG. 1 is a block diagram of an exemplary fast track dental operative unit.

The subject innovation is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

In FIG. 1, an exemplary fast track dental operative unit 10 includes a rail system 20, an arm system 30 and a illumination unit 40. The fast track dental operative unit 10 is designed for easy room installation. The fast track dental operative unit 10 is AC-powered and configured to supply oral cavity illumination when operated and used by dentists and other legally qualified medical professionals.

Figure 2:
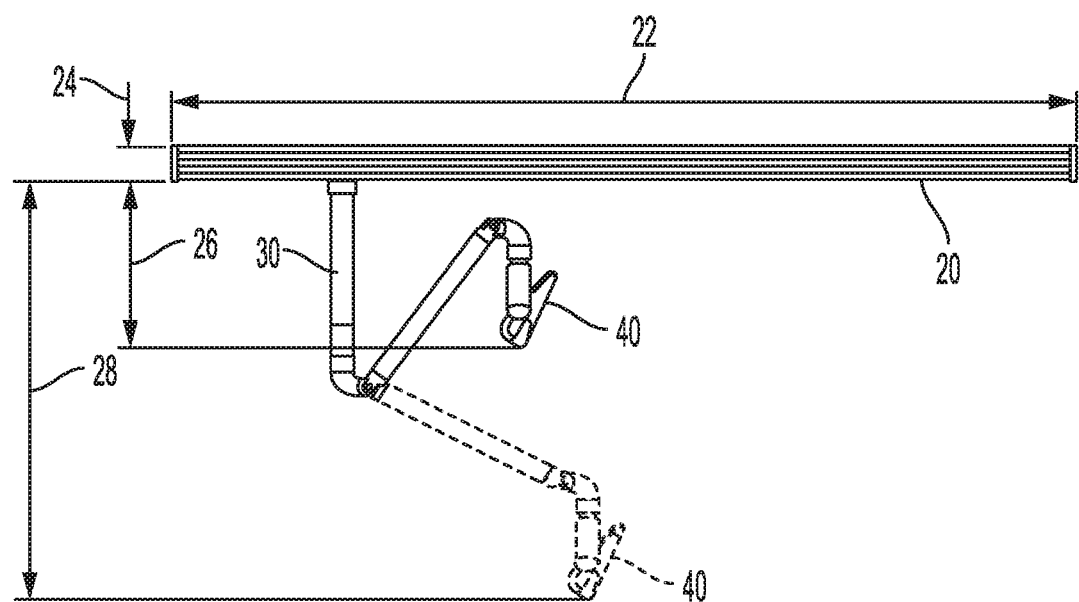
FIG. 2 is a side view of the fast track dental operative unit.

In FIG. 2, a side view of the fast track dental operative unit 10 illustrates exemplary overall dimensions of the various components. For example, a length 22 of the rail system 20 is preferably 73 inches and a depth 24 is preferably 3 inches. When the arm system 30 is in a raised position, a length 26 from the rail system 20 to an end of the illumination unit 40 is preferably 16 inches. When the arm system 30 is in an extended position, a length 28 from the rail system 20 to an end of the illumination unit 40 is preferably 41 inches.

Figure 3:
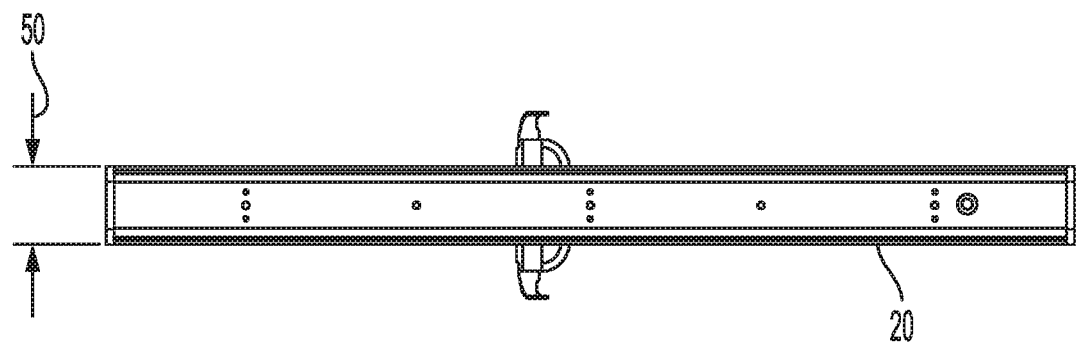
FIG. 3 is a top view of the rail system.

In FIG. 3, a top view of the rail system 20 illustrates a preferred width 50 of five inches.

Figure 4:
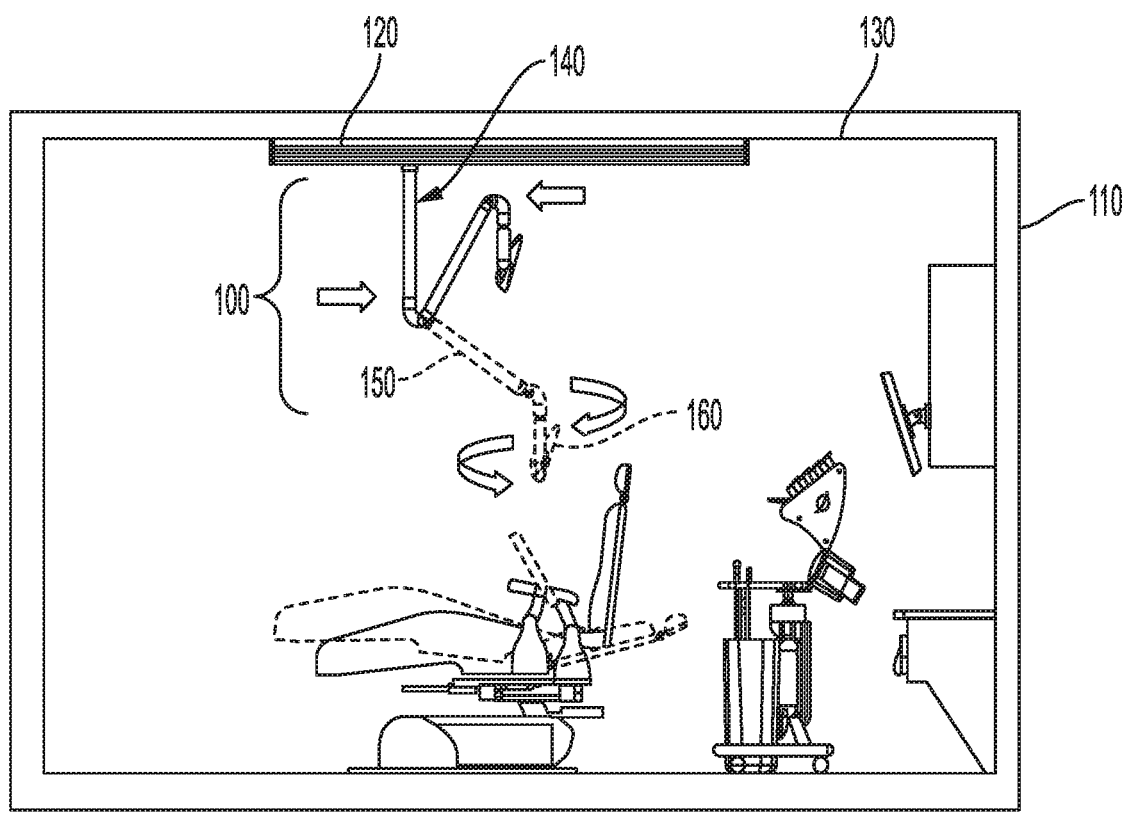
FIG. 4 is side view of a fast track dental operative unit shown positioned in an exemplary room.

In FIG. 4, side view of a fast track dental operative unit 100 is shown positioned in an exemplary room 110. A rail system 120 of the fast track dental operative unit 100 is shown secured to a ceiling 130. An upper tube portion 140 of an arm system is releaseably attached to the rail system 120 and can slide forward and back within the rail system 120 to any desired position. The upper tube portion 140 can also rotate within the rail system 120, enabling a lower tube section 150 of the arm system, which is attached to the upper tube section 140 on one end and to a illumination unit 160 at an opposite end, to rotate. Thus, illumination unit 160 is provided with three axis movement for maximum positioning.

Figure 5:
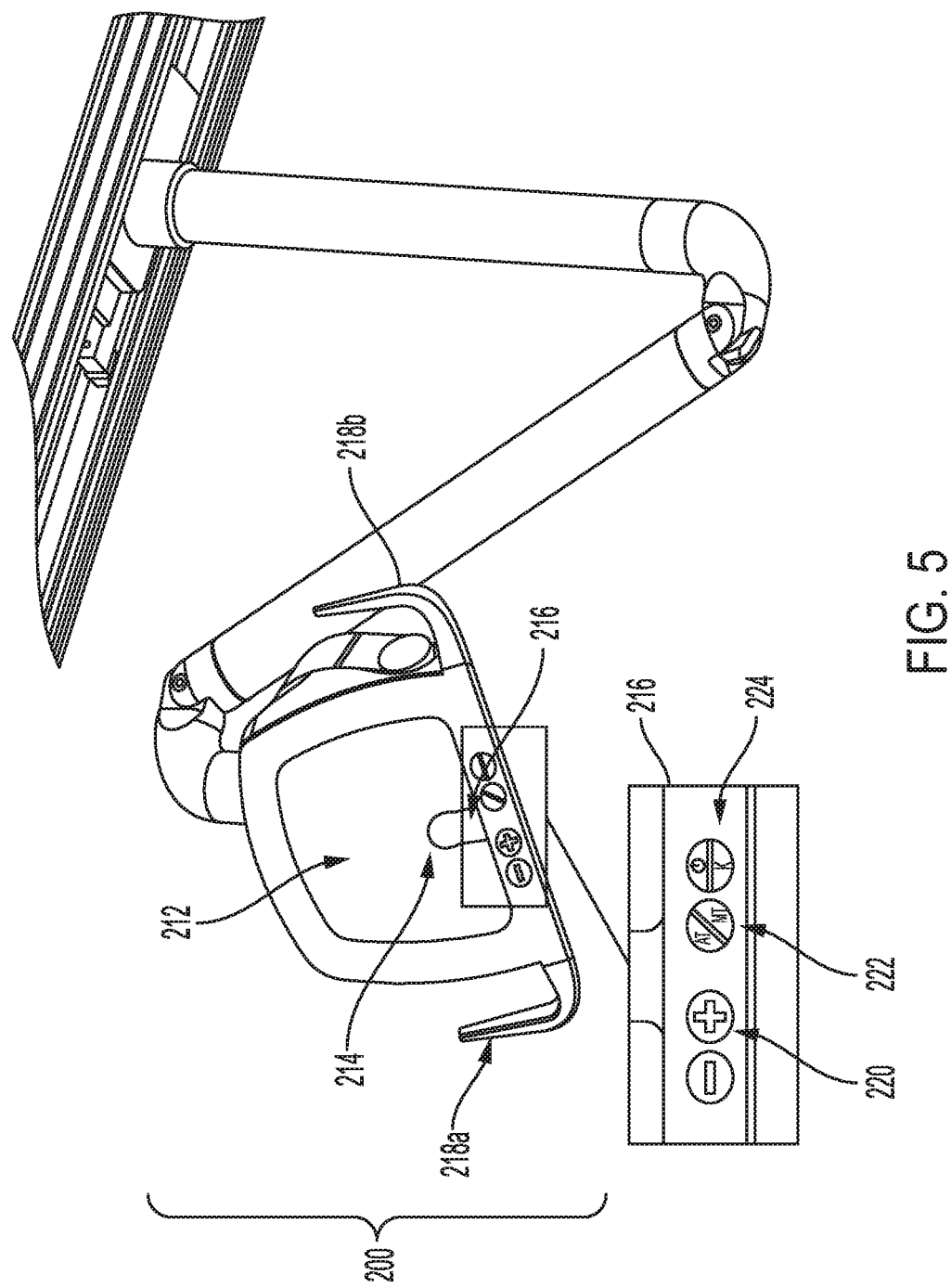
FIG. 5 is an exemplary illumination unit.

In FIG. 5, an exemplary illumination unit 200 includes an illumination source 212, such as a fluorescent bulb, a sensor switch 214, a digital readout area 216 and a pair of opposing handles 218a, 218b. The digital readout area 216 includes an illumination adjustment touchpad 220, a toggle switch 222 and combination switch 224. The toggle switch 222 enables a change in operating mode to be selected between a sensor operating mode and a manual operating mode. The combination switch 224 enables manual powering on/off and a light color temperature selection.

Figure 6:
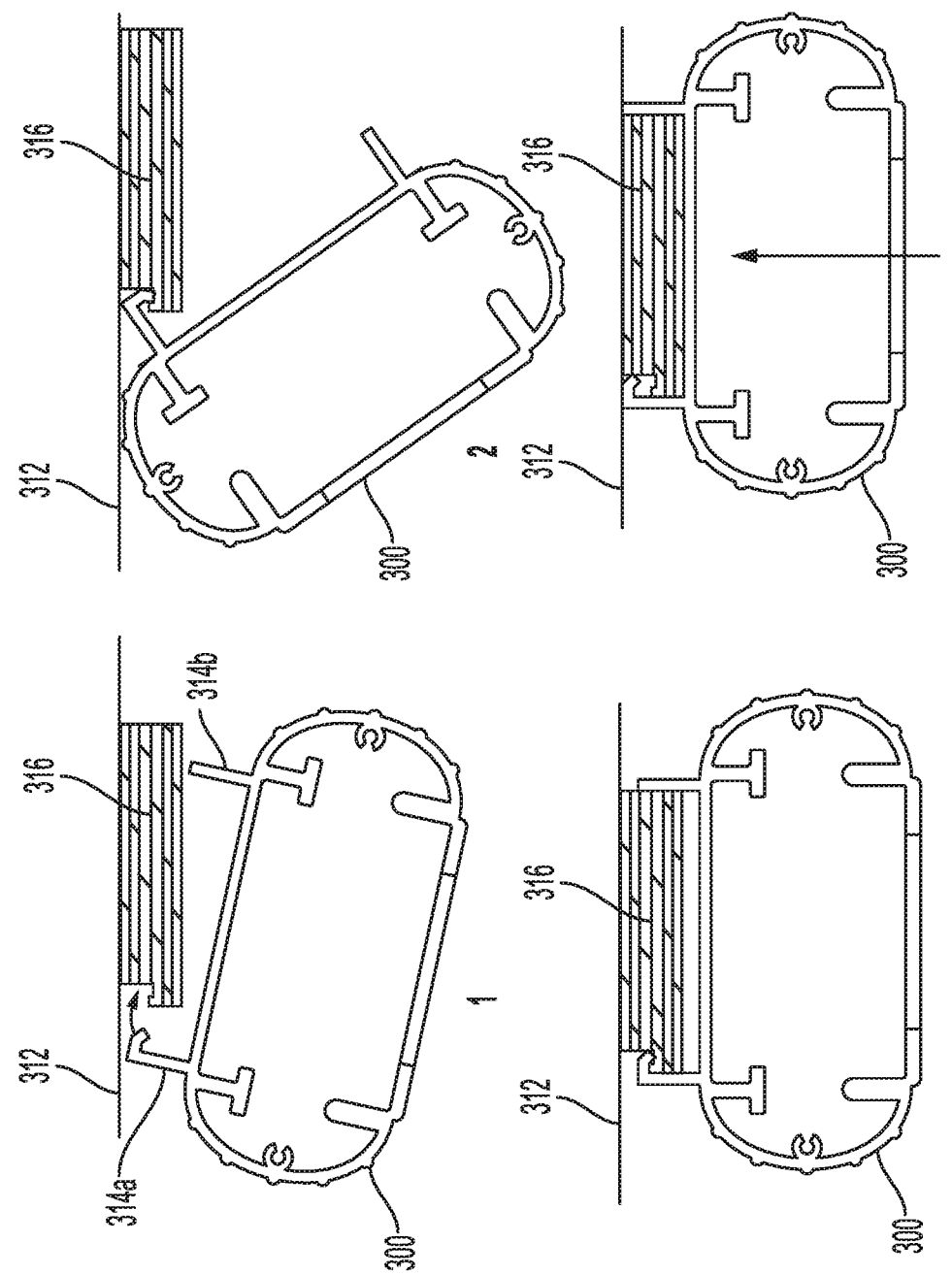
FIG. 6 illustrates exemplary steps in securing a rail system to a ceiling.

In FIG. 6, exemplary steps in securing a rail system 300 to a ceiling 312 are illustrated. In a preferred embodiment, the rail system 300 is constructed of aluminum and includes first and second hook rails 314a, 314b that are configured to mate with portions of the mounting board 316, which is secured to the ceiling 312 prior to installation. In 1, the hook rail 314a is inserted into the mounting board 316. In 2, wires (not shown) are feed into the free hanging rail system 300. In 3, the rail system 300 is rotated into position with respect to the mounting board 316 using hood rail 314b for proper positioning. In 4, once positioned, the rail system 300 is secured to the mounting board 316 using fasteners, such as screws, for example. A length between hook rail 314a and hook rail 314b is approximately equal to a width of the mounting board 316 to insure a snug fit.

Figure 7:
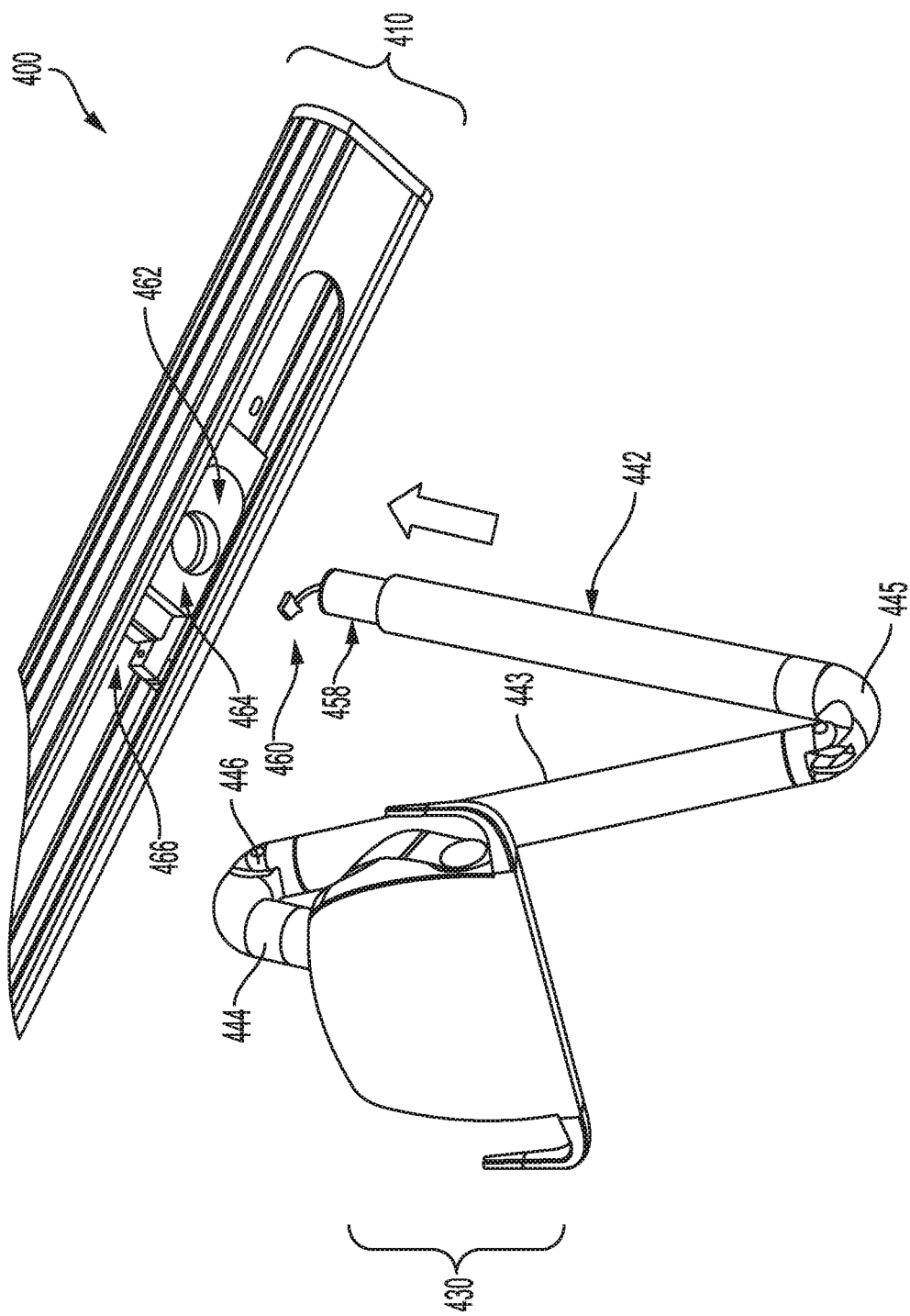
FIG. 7 illustrates an exemplary assembly of a fast track dental operative unit.

In FIG. 7, an exemplary assembly of a fast track dental operative unit 400 is shown. As described above, the fast track dental operative unit 400 includes a rail system 410, an arm system 420 and a illumination unit 430. The arm system 420 includes an upper tube section 442, a middle tube section 443 and a lower tube section 444. The upper tube section 442 and the middle tube section 443 are joined together by a pivoting joint 445 and the middle tube section 443 and the lower tube section 444 are joined together by a pivoting joint 446. The illumination unit 430 is joined to the lower tube section 444 opposite the pivoting joint 446, which includes slip ring wire connection that enables the illumination unit 430 to rotate 360 degrees.

An upper end 458 of the upper tube section 442 of the arm system 420 is threaded and includes a male two-piece pin and socket interconnection (e.g., Molex) connector 460. Slip ring wire connections at upper end 458 enable the upper tube section 442 to rotate a full 360 degrees. A trolley 462 in the rail system 410 includes a threaded aperture 464 and a female two-piece pin and socket interconnection (e.g., Molex) connector 466. The connectors 460 and 466 are joined and when the upper end 258 is threaded into the aperture 264 assembly is complete.

Figure 8:
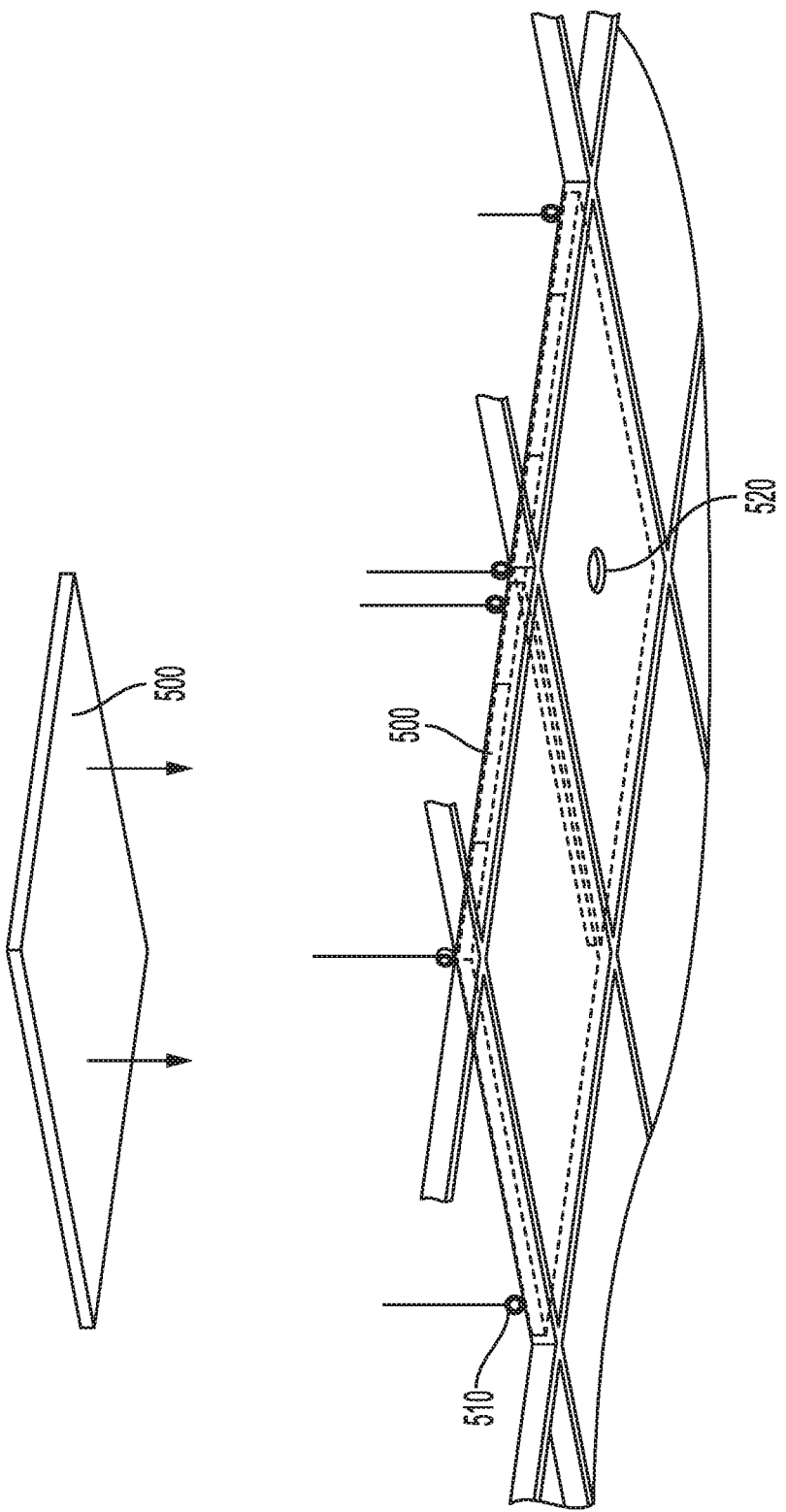
FIG. 8 illustrates an exemplary reinforcement for a drop ceiling to support the fast track dental operative unit.

In FIG. 8, an exemplary reinforcement for a drop ceiling to support the fast track dental operative unit described above is shown. A 24"×24"×¾" sheet of plywood 500 is used. The plywood 500 is tied above the structure at its four plywood corners 510. A hole 520 is provided for electrical feed. Panels are fixed by screwing through a side of a T-bar grid 530.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A fast track dental operative unit comprising:
   a rail system, the rail system comprising a trolley within a cavity and first and second hook rails that are configured to mate with corresponding portions of a mounting board secured directly to a ceiling, a length between the first and second hook rails approximately equal to a width of the mounting board to insure a snug fit;
   an arm system configured to link to the rail system, the arm system comprising an upper tube section, a middle tube section and a lower tube section, an end of the upper tube section including slip ring wire connections to enable the upper tube section to rotate a full 360 degrees within the rail system; and
   an illumination unit configured to link to the lower tube section, an end of the lower tube section including slip ring wire connections to enable the illumination unit to rotate a full 360 degrees with respect to the lower tube section.

2. The fast track dental operative unit of claim 1 wherein the upper tube section and the middle tube section are joined together by a pivoting joint.

3. The fast track dental operative unit of claim 2 wherein the middle tube section and the lower tube section are joined together by a pivoting joint.

4. The fast track dental operative unit of claim 3 wherein the illumination unit is joined to the lower tube section opposite the pivoting joint.

5. The fast track dental operative unit of claim 4 wherein the upper tube section includes an upper end.

6. The fast track dental operative unit of claim 5 wherein the upper end is threaded and includes a male two-piece pin and socket interconnection connector.

7. The fast track dental operative unit of claim 6 wherein the male two-piece pin and socket interconnection connector is a Molex connector.

8. The fast track dental operative unit of claim 6 wherein the trolley in the rail system includes a threaded aperture and a female two-piece pin and socket interconnection connector.

9. The fast track dental operative unit of claim 8 wherein the female two-piece pin and socket interconnection connector is a Molex connector.

10. The fast track dental operative unit of claim 1 wherein the illumination unit comprises:
    an illumination source;
    a sensor switch;
    a digital readout area; and
    a pair of opposing handles.

11. The fast track dental operative unit of claim 10 wherein the digital readout area comprises:
    an illumination adjustment touchpad;
    a toggle switch; and
    a combination switch.

12. The fast track dental operative unit of claim 11 wherein the toggle switch enables a change in operating mode to be selected between a sensor operating mode and a manual operating mode.

13. The fast track dental operative unit of claim 11 wherein the combination switch enables manual powering on/off and a light color temperature selection.

* * * * *